United States Patent
Heimann

[11] Patent Number: 5,601,162
[45] Date of Patent: Feb. 11, 1997

[54] SPRING APPLIED AUTOMATIVE PARKING BRAKE SYSTEM

[75] Inventor: Robert L. Heimann, Moberly, Mo.

[73] Assignee: Orscheln Co., Moberly, Mo.

[21] Appl. No.: 368,831

[22] Filed: Dec. 13, 1994

[51] Int. Cl.[6] ............ F16D 65/16; B60K 41/28
[52] U.S. Cl. ........................ 188/170; 192/4 A
[58] Field of Search ............ 188/72.3, 106 F, 188/170, 171, 173, 265; 192/4 A, 4 R, 12 BA; 74/501.6, 512, 516, 531

[56] References Cited

U.S. PATENT DOCUMENTS

| | | | |
|---|---|---|---|
| 3,003,605 | 10/1961 | Apple | 192/4 A |
| 3,236,121 | 2/1966 | Gdowik et al. | 74/531 |
| 3,249,180 | 5/1966 | Tovossian | 74/531 |
| 3,299,999 | 1/1967 | Martin | 192/4 A |
| 3,346,079 | 10/1967 | Davis et al. | 188/170 |
| 3,358,797 | 12/1967 | Walton | 192/4 A |
| 3,601,232 | 8/1971 | Elias | 188/170 |
| 3,842,950 | 10/1974 | Fontaine | 188/170 |
| 3,844,183 | 10/1974 | Wilker | 192/4 A |
| 3,943,829 | 3/1976 | Newstead et al. | 188/170 |
| 3,972,398 | 8/1976 | Chamberlain | 192/4 A |
| 4,191,283 | 3/1980 | Keeny, III | 192/26 |
| 4,454,936 | 6/1984 | Wise | 192/4 A |
| 4,532,462 | 7/1985 | Washbourn et al. | 318/372 |
| 4,546,298 | 10/1985 | Wickham et al. | 318/372 |
| 4,553,650 | 11/1985 | Warwick et al. | 188/106 F |
| 4,629,043 | 12/1986 | Matsuo et al. | 192/4 A |
| 4,850,242 | 7/1989 | Hass et al. | 74/512 |
| 5,004,077 | 4/1991 | Carlson et al. | 188/2 D |
| 5,029,681 | 7/1991 | Swiatek | 192/4 A |
| 5,036,961 | 8/1991 | Eberling et al. | 192/1.23 |
| 5,092,432 | 3/1992 | Taig | 188/72.3 |
| 5,180,038 | 1/1993 | Arnold et al. | 188/171 |

OTHER PUBLICATIONS

Hayes Industrial Brake, Inc.; Advertisement entitled "Spring Applied Hydraulic Release Chamber".
"New Design Prevents Spring Explosion When Servicing Brake Parts"; reprinted from Power Transmission Design, Penton Publishing, 1990.

Primary Examiner—Robert J. Oberleitner
Assistant Examiner—Chris Schwartz
Attorney, Agent, or Firm—Arnold, White & Durkee

[57] ABSTRACT

A spring applied parking brake system for a vehicle including a housing connected with the vehicle chassis, a pivot arm assembly for connection with the parking brake cable of the vehicle, a main spring biasing the pivot arm assembly toward a brake-applied position relative to the housing, a spring compression assembly operable to displace the pivot arm assembly toward a brake-released position relative to the housing, a retaining device normally retaining the pivot arm assembly in the brake-released position, and a release device for releasing the retaining assembly, whereby the pivot arm assembly is released for displacement by the main spring toward the brake-applied position. Preferably, the retaining device includes a helical clutch spring mounted concentrically on a rotatable hub portion of the pivot arm assembly and the compression assembly includes a hydraulic or pneumatic pump and piston.

18 Claims, 8 Drawing Sheets

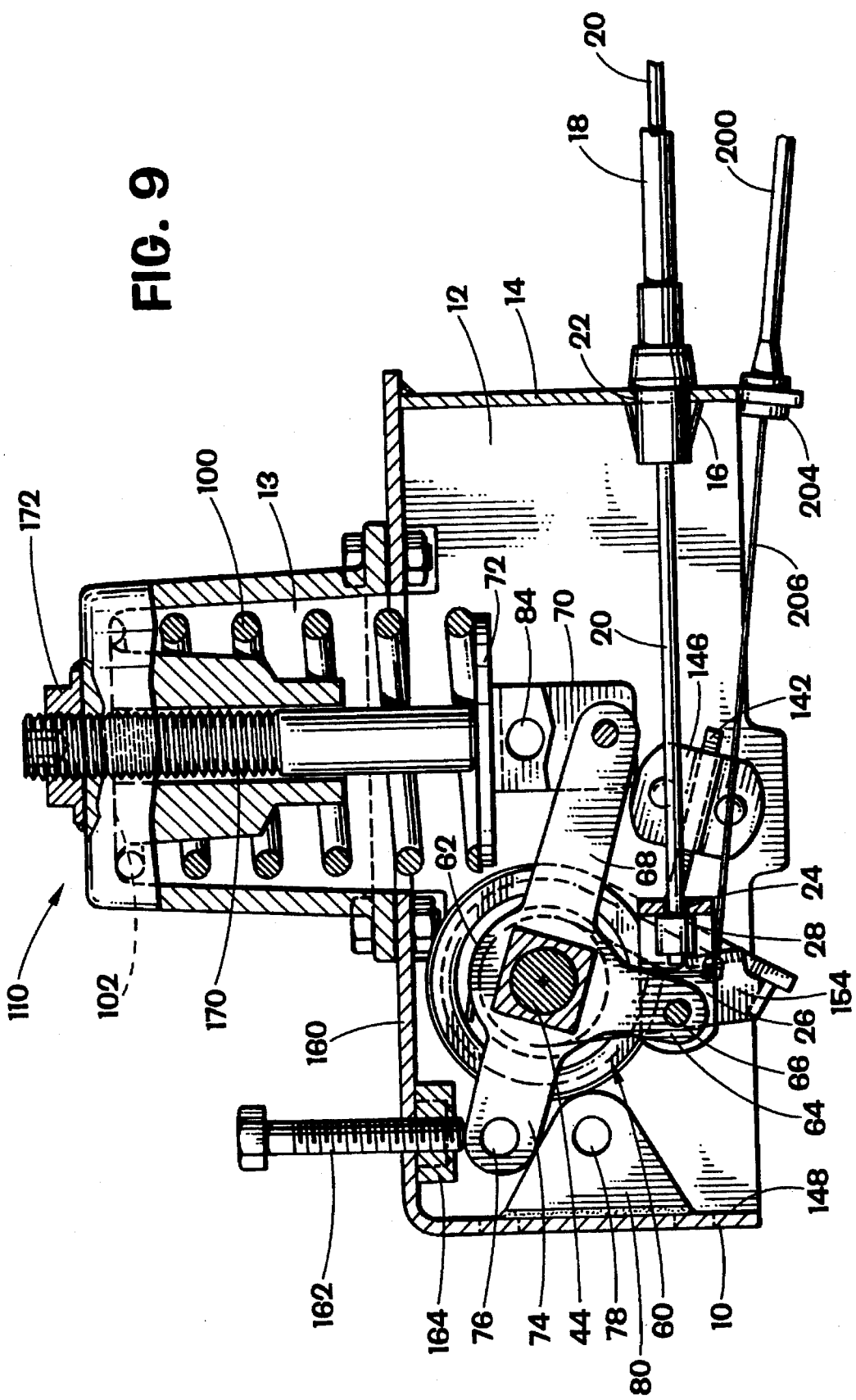

SPRING APPLIED AUTOMATIVE PARKING BRAKE SYSTEM

BACKGROUND OF THE INVENTION

1. Field of the Invention

A spring applied parking brake system is disclosed having a main spring for normally biasing a pivot arm assembly relative to a housing toward a brake-applied position, thereby to tension the parking brake cable to apply the vehicle parking brake, and a spring compression assembly for rotating the pivot arm assembly in the opposite direction toward a brake-released position in which the tension is released from the cable. A manually-operable or solenoid-operable release device is provided for releasing a retaining assembly that normally retains the pivot arm assembly in the brake-released condition.

2. Brief Description of the Related Art

In the motor vehicle brake art, it is typical for high gross weight vehicles to use air brake mechanisms which counteract springs in the service brake system. In order to set the parking brake, the air is released to the system, thereby applying brakes at all service wheels. On the other hand, medium gross weight vehicles (i.e., trucks in the weight range of about 15,000 to 33,000 pounds gross weight) do not normally use air brakes for primary braking, thereby limiting their access to multiwheel types of parking brake systems. Owing to their weight, these heavy and medium duty vehicles normally avoid the use of pawls in their transmission systems, and consequently the transmissions do not have conventional "park" positions. In medium gross weight vehicles, a separate hydraulic brake mechanism actuated system is sometimes used to provide the parking brake function. However, not all vehicles in this environment have hydraulic systems capable of operating at the pressures and flow rates required to provide an effective parking brake function.

It is also known in the art to provide motor-driven brake systems. There also exists in the art electro/mechanical actuators for generating the loads required for parking brake systems. However, these devices often do not provide the stored energy necessary to effect the parking brake function in the event of a power failure. Furthermore, releasable helical clutch springs concentrically mounted on a shaft have been provided for retaining the parking brake in the brake-applied condition. Upon separation of the end leg portions of the spring, the turns of the spring are expanded to release the shaft, thereby to release the parking brake. Such a clutch spring could be operated manually or mechanically by such means as a solenoid.

It is further known in the art to provide parking brake systems that include a main spring normally biased in a brake-applied direction. Such systems include apparatus for compressing and holding the main spring in a brake-released position. One method of compressing the main spring is through the use of a motor driven screw drive system. Such a system is evidenced by commonly assigned U.S. Pat. No. 5,180,038 to Arnold, et al. Other systems for compressing the main spring include the use of hydraulic or pneumatic pumps and pistons. One drawback to using a screw drive system for compressing and holding the main spring is that such systems may require more time for the main spring to engage the parking brake when the retention means is released. A major drawback to using a hydraulic or pneumatic type system to compress the main spring is that the systems must remain under pressure in order to maintain the spring in the brake-released position and if the hydraulic or pneumatic systems either leak or otherwise fail, then the main spring may prematurely engage the parking brake.

The present invention was developed to overcome these and other perceived shortcomings of the prior art.

SUMMARY OF THE INVENTION

Accordingly, a primary object of the present invention is to provide a spring applied parking brake system including a main spring for biasing a pivot arm assembly in a given direction relative to a housing for operating the parking brake cable to a brake-engaged condition, a spring compression assembly for driving the pivot arm assembly in the opposite direction toward a brake-released position, a retaining assembly for retaining the pivot arm assembly in the brake-released position, and a release assembly for releasing the retaining assembly, thereby permitting the main spring to displace the pivot arm assembly toward the brake-applied position.

According to a more specific object of the invention, the pivot arm assembly includes a bellcrank fixedly attached to a hub that is concentrically mounted on a main pivot. The bellcrank is displaced relative to the housing by a spring compression assembly that may consist of a hydraulic, pneumatic or mechanical screw drive system located either concentrically in line with the main spring or otherwise inside the outer housing such that it operably contacts the pivot arm assembly. The retaining assembly comprises a helical clutch spring mounted concentrically on the hub of the pivot arm assembly, the orientation of the turns of the helical spring being such that the pivot arm assembly may be rotatably driven in the brake-released direction, but retained against rotation in the opposite direction by the clutch spring. The release assembly may be a manually-operable cable connected with one leg of the clutch spring, or an electrically operable solenoid mounted on the housing and connected with one leg of the clutch spring.

Another more specific object of the invention is to size and position the retaining assembly in such a way that the retaining assembly by itself will retain the pivot arm assembly and main spring in the brake-released position independently of the spring compression assembly thereby providing a fail-safe system.

Another object of the invention is to provide improved means for releasing stored energy to actuate a parking brake, thereby to provide a system that is suitable for application on a wider variety of vehicles than previously addressed by current systems. This is partly accomplished by reducing the force needed to engage the parking brake cable by using a pivot arm assembly acting as a lever to transfer stored energy from the main spring to the parking brake cable.

Another object of the invention is to provide a safety pin assembly that may be inserted through both the housing and the pivot arm assembly to lock the main spring in the brake-released position during shipping.

A further object of this invention is to provide a means for manual application of the parking brake in the event of electrical power, pneumatic, or hydraulic failure. The parking brake system also provides a means for manual release after the parking brake is applied.

The parking brake system may be applied or released manually, interlocked with the transmission shifter via separate switches to activate parking brake function, or switch-controlled by means other than the transmission shift interlock such as by seat-switch activation. It is designed to use stored energy from a spring mechanism, thereby to provide the parking brake function in the event of electrical or mechanical power failure.

BRIEF DESCRIPTION OF THE DRAWINGS

Other objects and advantages of the invention will become apparent from a study of the following specification when viewed in light of the accompanying drawings, in which:

FIG. 9 is a sectional view of the parking brake system in the brake-released position, incorporating a mechanical screw drive system.

DETAILED DESCRIPTION

Figure 1:
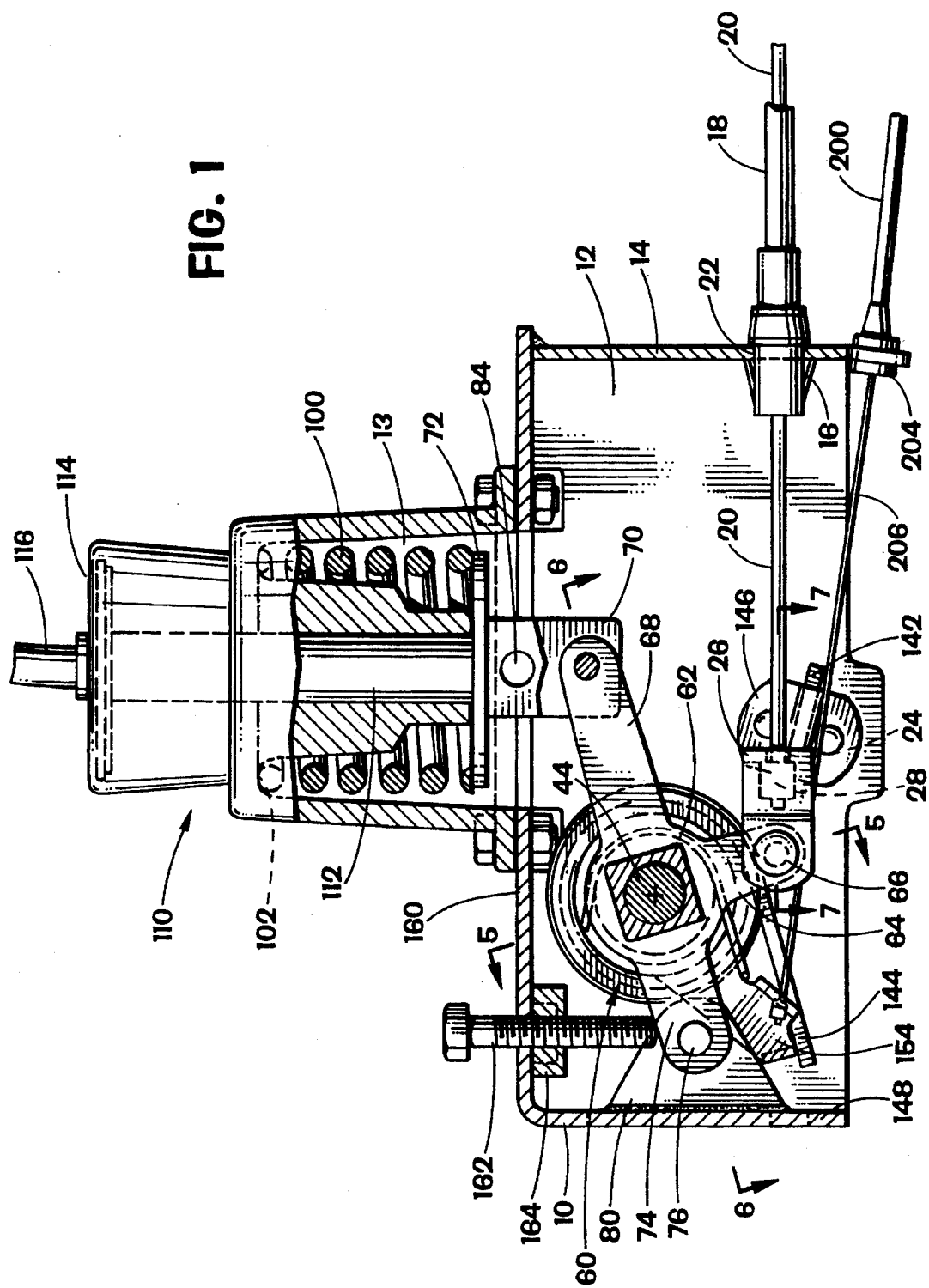
FIG. 1 is a sectional view of the parking brake system in the brake-released position taken along line 1—1 of FIG. 5.
Figure 3:
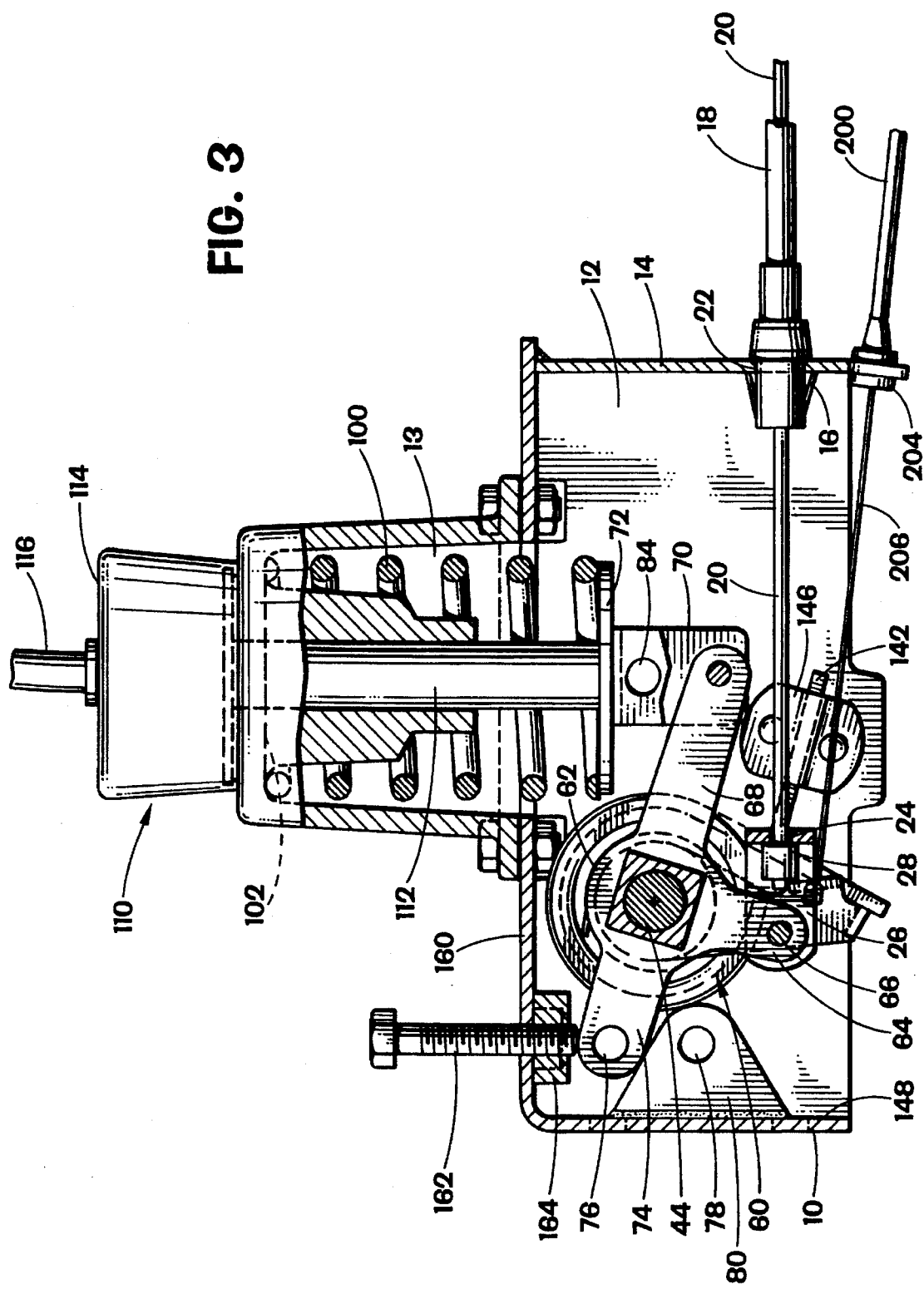
FIG. 3 is a sectional view of the parking brake system in the brake-applied position taken along line 1—1 of FIG. 5.
Figure 7:
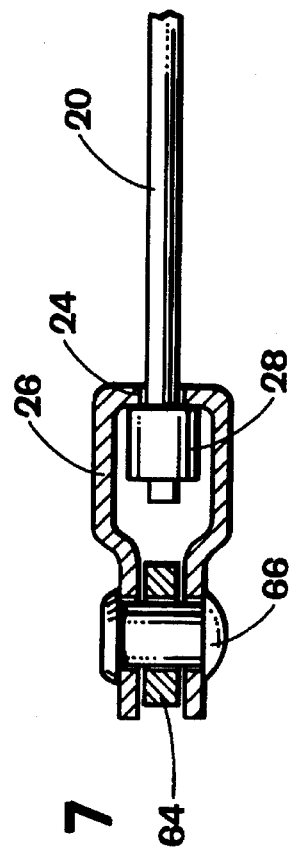
FIG. 7 is a sectional view taken along line 7—7 of FIG. 1.

Referring first more particularly to FIGS. 1 and 3, the spring applied parking brake system includes a housing 10 that is secured to the vehicle chassis and contains a chamber 12. Threadably mounted on a first end wall 14 of the housing by cable fastener means 16 is one end of the parking brake cable assembly, the inner cable member 20 passing through a hole 22 in the first end wall, through a hole 24 of a brake cable clevis 26 and being fastened within said clevis by a suitable fastener assembly 28. (See FIG. 7 for a section through said brake cable clevis 26). At its other end, the inner cable member 20, which is protected by flexible cable housing 18, is connected with the vehicle parking brake, as is known in the art.

Figure 5:
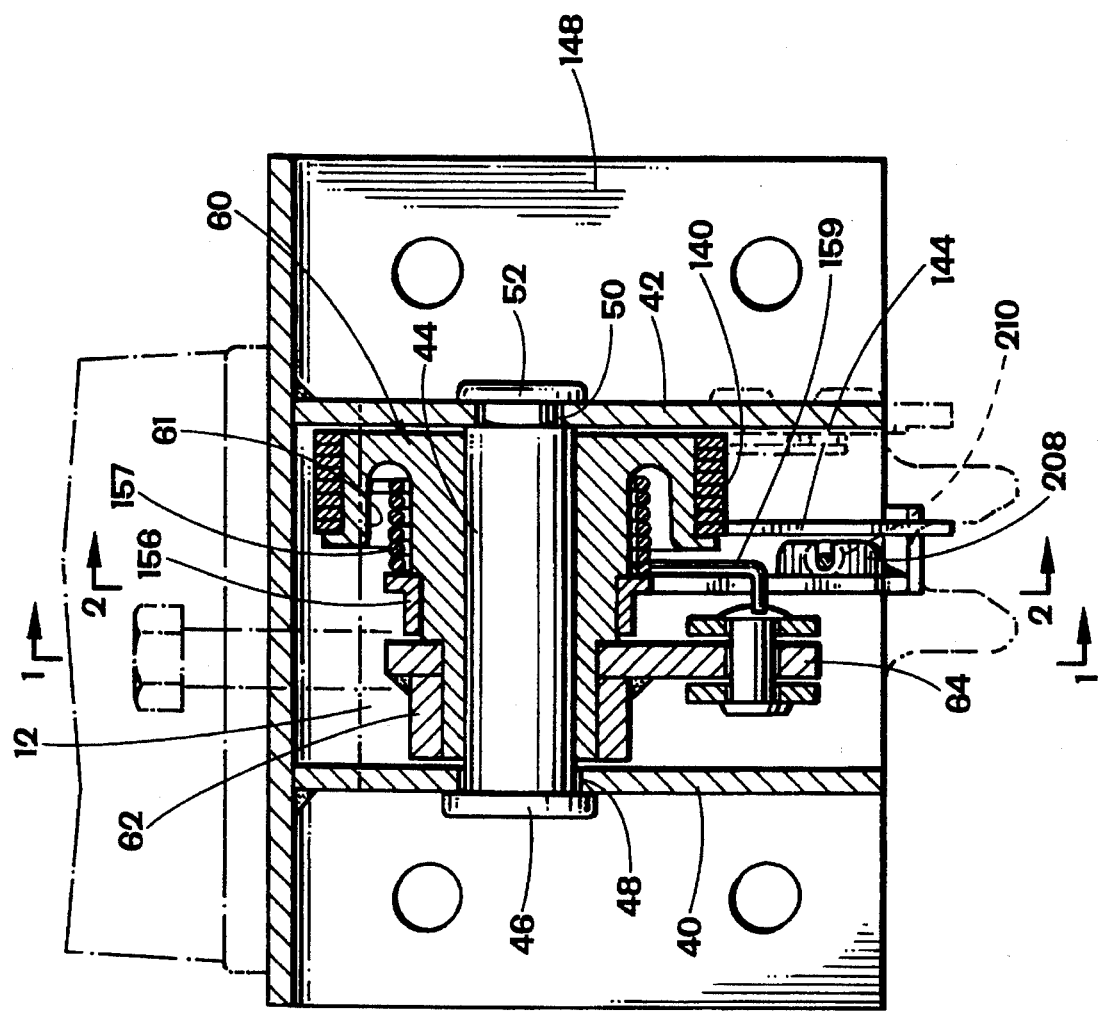
FIG. 5 is a sectional view taken along line 5—5 of FIG. 1.
Figure 6:
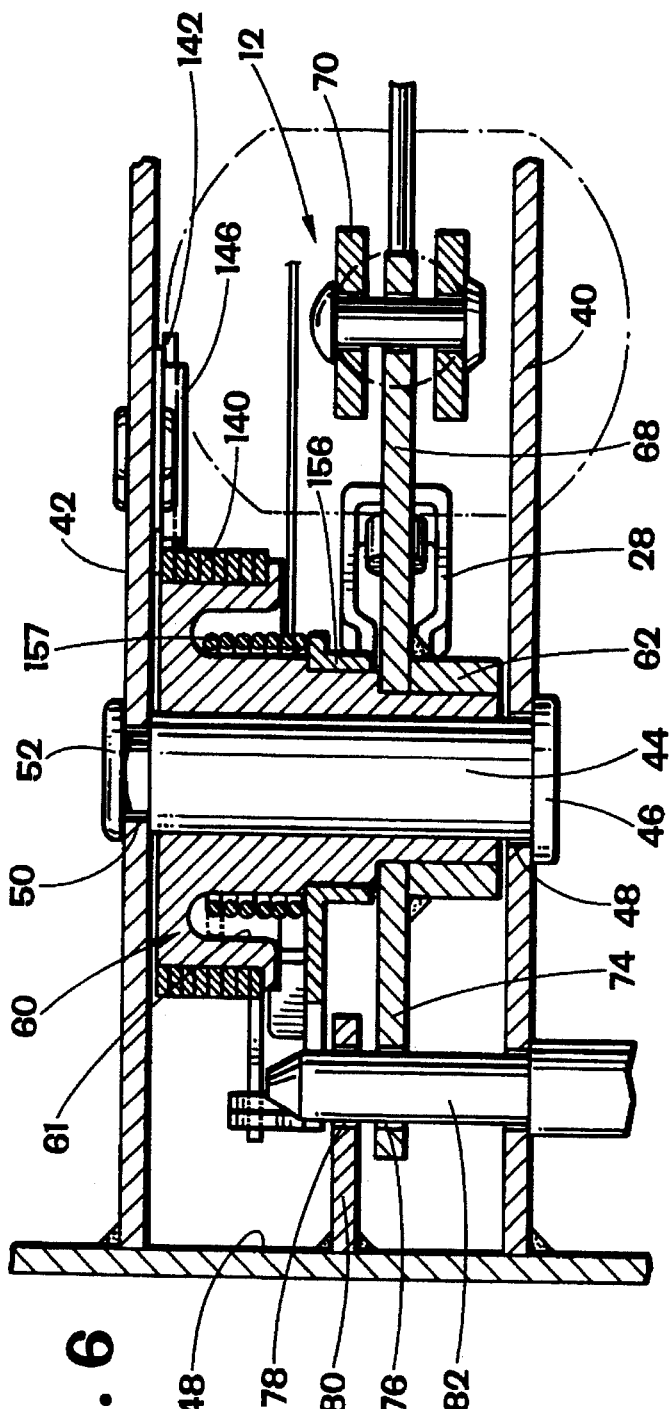
FIG. 6 is a sectional view taken along line 6—6 of FIG. 1.

Referring now to FIGS. 5 and 6, mounted within the housing chamber 12 between a first housing side wall 40 and a second housing side wall 42 is a main pivot 44. The main pivot 44 has a first flanged end 46 which is larger than opening 48 in said first housing side wall 40. The main pivot 44 extends through opening 50 in said second housing side wall 42 and is held in place by pivot cap 52.

Rotatably mounted concentrically about main pivot 44 is pivot arm assembly hub 60. Fixedly attached to said hub 60 is bellcrank 62.

Returning to FIG. 1, bellcrank 62 and hub 60 are mounted concentrically about said main pivot 44 within the housing chamber 12. Bellcrank 62 has a first leg 64 that is pivotally attached by a retaining pin 66 to brake cable clevis 26. Bellcrank 62 has a second leg 68 that is pivotally attached to a main spring control clevis 70, which is fixedly attached to a main spring compression washer 72.

In a preferred embodiment, bellcrank 62 has a third leg 74 having a safety pin opening 76 such that the safety pin opening 76 in the bellcrank 62 lines up with a second safety pin opening 78 (shown in FIG. 3) within a safety retention member 80 (which is fixedly attached to a second end wall 148 of housing 10) when the bellcrank 62 is in the brake-released position (as shown in FIG. 1). A safety pin 82 (shown in FIG. 6) may then be inserted through said safety pin holes 76 and 78 to retain the bellcrank in the brake-released position for ease of shipment. Alternatively, a safety pin hole 84 could be located in the main spring control clevis 70 such that when bellcrank 62 is in the brake-released position, safety pin hole 84 lines up with similarly sized safety pin holes (not shown) in side walls 40 and/or 44.

Also mounted within a cylindrical spring chamber 13 of the housing chamber 12 is a strong compression main spring 100 one end of which operably engages the adjacent housing end wall 102, and the other end of which engages the main spring compression washer 72 thereby biasing the bellcrank 62 toward the brake-applied position (shown in FIG. 3), whereupon the inner cable member 20 is tensioned to cause the parking brake to be in the brake-applied position.

Mounted adjacent housing 10 near the cylindrical spring chamber 13 is the spring compression assembly 110. As illustrated, a preferred embodiment of the spring compression assembly comprises a hydraulic piston 112 fixedly attached to the main spring compression washer 72, said hydraulic piston being concentrically positioned inside the main spring 100, a hydraulic pump assembly 114 and a flexible hydraulic hose 116. The spring compression assembly is positioned such that when the spring compression assembly is activated, the piston 112 is drawn upwards thus compressing the main spring and moving the bellcrank 62 towards the brake-released position (shown in FIG. 1), whereupon the tension in the inner cable member 20 is loosened to cause the parking brake to be in the brake-released position.

Figure 8:
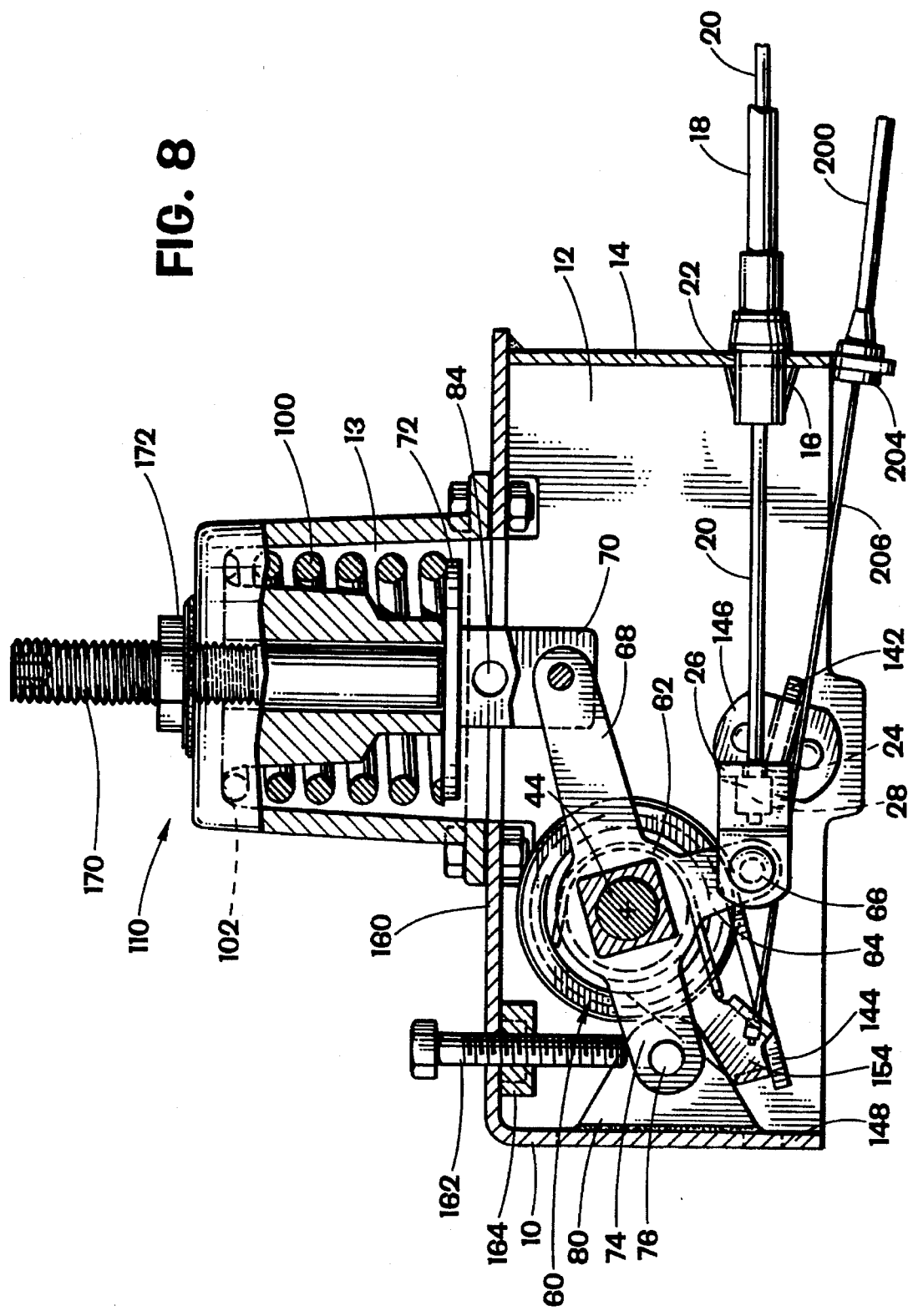
FIG. 8 is a sectional view of the parking brake system in the brake-applied position, incorporating a mechanical screw drive system.

Alternatively, the spring compression assembly could consist of a pneumatic pump and piston instead of a hydraulic pump and piston. Also alternatively, the spring compression assembly could consist of a motorized screw drive system. Referring to FIGS. 8 and 9, member 170 would be a threaded screw drive instead of a piston and member 172 would be a motorized system capable of causing a threaded member to rotate and thus causing the screw drive 170 to move upwards or downwards.

Figure 2:
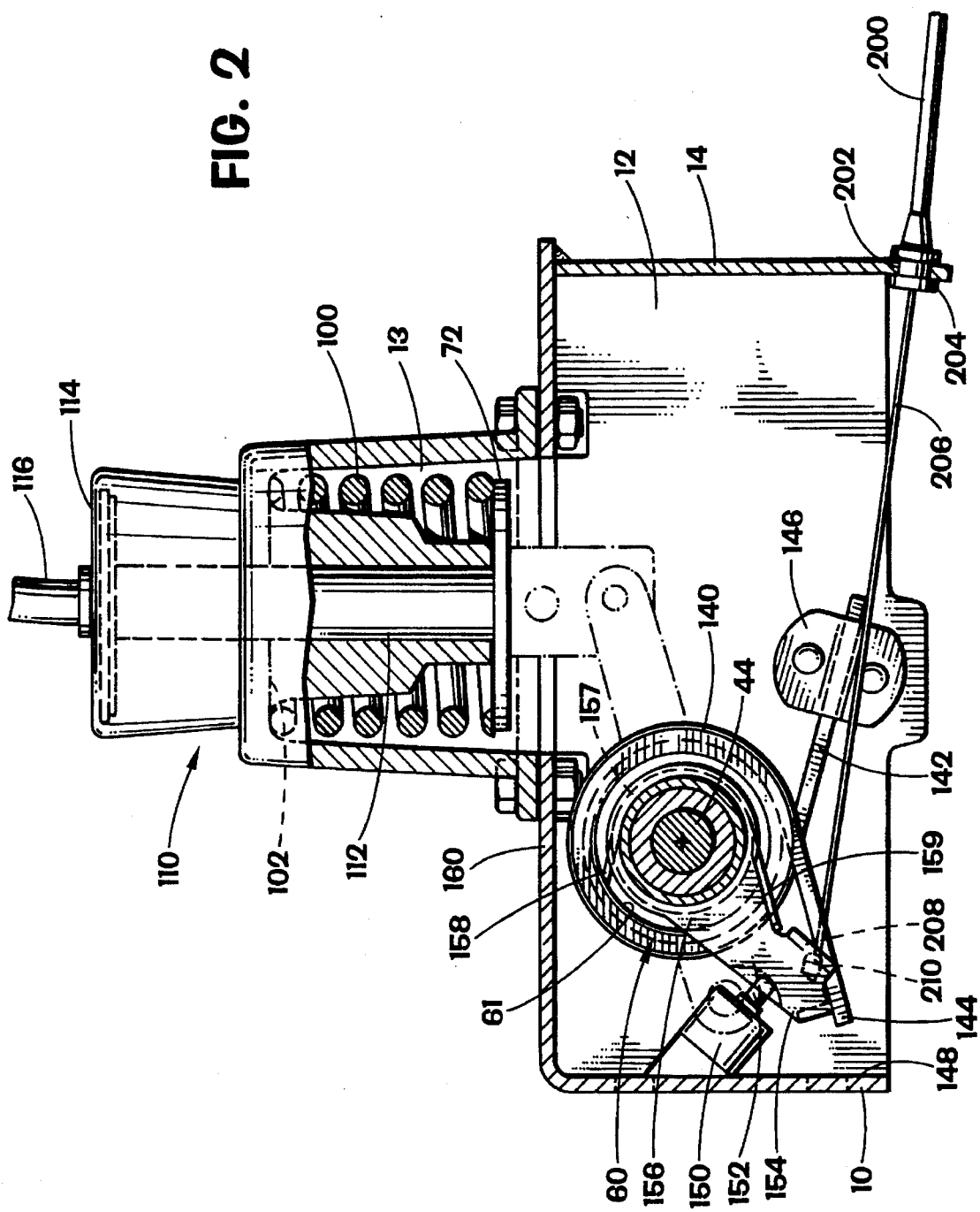
FIG. 2 is a sectional view of the parking brake system in the brake-released position taken along line 2—2 of FIG. 5.
Figure 4:
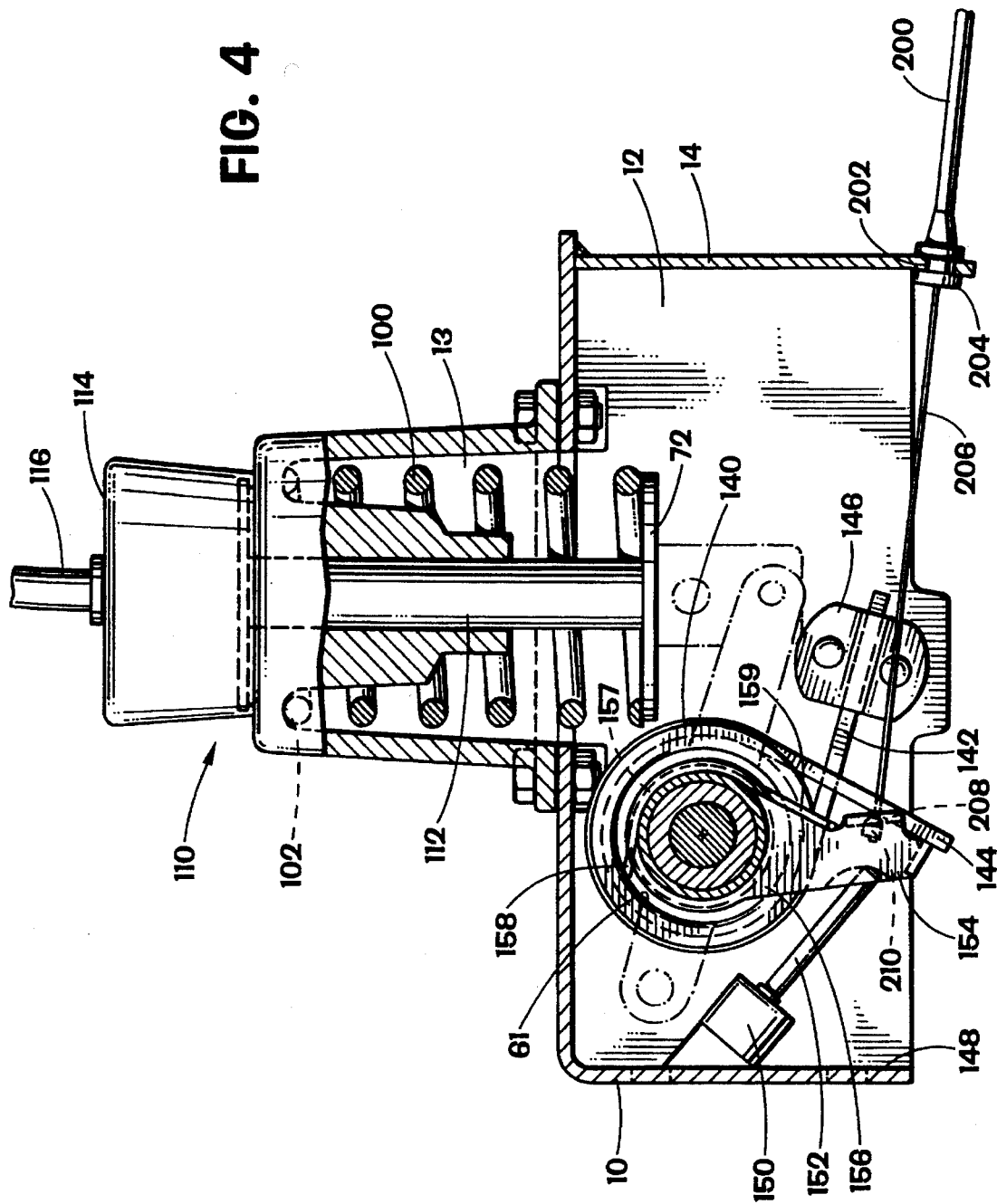
FIG. 4 is a sectional view of the parking brake system in the brake-applied position taken along line 2—2 of FIG. 5.

Referring to FIGS. 2 and 4, mounted concentrically about the hub 60 is a helical clutch spring 140 which is provided at its ends with radially outwardly extending leg portions 142 and 144 respectively. The orientation of the turns of the helical clutch spring 140 is such as to permit rotation of the hub 60 and bellcrank 62 in a direction toward the parking brake-released position (shown in FIG. 1). The first leg portion 142 is fixedly connected with second housing side wall 42 by means of a retaining clamp 146 suitably connected to housing wall 42. A brake-apply arm 156 is rotatably mounted concentrically around the hub 60 of the pivot arm assembly such that an outwardly extending portion 154 of the brake apply arm 156 may detachably engage the second leg portion 144 of the helical clutch spring 140. The outwardly extending portion 154 of the brake apply arm 156 is biased away from the second leg portion 144 of the helical clutch spring 140 by a second helical clutch spring 157, which is concentrically mounted around the hub 60. The second clutch spring 157 is provided at its ends with radially outwardly extending leg portions 158 and 159 respectively. The first leg portion 158 is biased against an inner surface 61 of hub 60. The second leg portion 159 is biased against the outwardly extending portion 154 of the brake apply arm 156.

Fixedly mounted on a second housing end wall 148 is the stator member of a solenoid 150 having an armature 152 capable of being detachably connected to the outwardly extending portion 154 of brake apply arm 156. Thus, when the solenoid 150 is energized, the armature 152 is protracted (i.e. shifted to the right as shown in FIG. 4), thereby displacing the second clutch spring leg 144 to the right relative to the first clutch spring leg 142, whereby the turns of the clutch spring 140 are expanded to release the hub 60 and thus bellcrank 62. Upon release of the clutch spring restraining assembly 140, the main spring 100 displaces the bellcrank toward the brake-applied position (shown in FIG. 3). The solenoid is de-energized when the brake has been released from its restrained position and has reached a brake applied position.

In a preferred embodiment (shown in FIGS. 1 and 3 but not FIG. 5), the upper wall 160 of housing 10 contains a threaded coupler 164 fixedly mounted on the inside of housing wall 160. A bolt 162 threadably engaged through housing wall 160 and coupler 164 may be manually rotated with a suitable wrench to displace the third arm 74 of the pivot arm assembly 62 to compress main spring 100 in the direction allowed by clutch spring 140, thereby to provide for unit release.

In a further embodiment of the invention (shown in FIGS. 2 and 4), a flexible cable housing 200 may be attached through an opening 202 in the first end housing wall 14 with a suitable coupler 204 allowing an internal brake-release cable 206 to pass through the opening 202. One end of the brake-release cable 206 is attached to an extending flange 208 of outwardly extending portion 154 of brake-apply arm 156 with a suitable fastening assembly 210. The other end of the brake-release cable 206 is attached to a suitable manually operable handle as is known in the art.

OPERATION

In operation, assume that the spring applied parking brake system is in the brake-actuated position illustrated in FIG. 3, whereby the parking brake cable 20 is tensioned to activate the vehicle parking brake. To release the parking brake, either a dash-mounted switch is operated, or the transmission shifter lever is displaced from the "park" position to operate hydraulic pump assembly 114. Hydraulic piston 112 is drawn upwards into flexible hydraulic hose 116 thus causing main spring compression washer 72 to compress main spring 100. The movement of main spring compression washer 72 causes bellcrank 62 to rotate with respect to main pivot 44 thereby releasing the tension in parking brake cable 20 (as is shown in FIG. 1) thereby releasing the parking brake. When the bellcrank reaches the brake-released position illustrated in FIG. 1, the operation of hydraulic pump assembly 114 is terminated, whereupon bellcrank 62 is maintained in the brake-released position by the cooperation between the turns of the helical clutch spring 140 and the peripheral surface of the metal hub 60. Thus, the parking brake system is retained in the brake-released condition, and the vehicle can be operated in a normal manner.

Assume that the vehicle is stopped, and the operator shifts the transmission shifter lever to the "park" position. A signal is sent to energize solenoid 150. When the armature 152 of solenoid 150 is displaced to the right from its brake-released position shown in FIG. 2, the end leg 144 of the clutch spring is displaced relative to stationery leg 142 to effect expansion of the turns of the clutch spring, thereby to release hub 60 and bellcrank 62. Main compression spring 100 then expands to rotate bellcrank 62 about main pivot 44 toward the brake-applied position illustrated in FIGS. 3 and 4. A dash-mounted switch or a seat-switch could also be provided to supply a signal for operating the release solenoid 150 as desired.

In accordance with an important feature of the invention, a manually operated override cable 206 is provided for displacing the movable clutch spring leg 144 in a direction to release the hub 60 and bellcrank 62, thereby to override the system and to effect immediate release of the clutch spring, whereby the main spring 100 returns the system to its normal brake-actuated condition.

While in accordance with the provisions of the Patent Statutes, the preferred forms and embodiments have been illustrated and described, it will be apparent to those skilled in the art that changes may be made without deviating from the inventive concepts set forth above.

What is claimed is:

1. A parking brake system for tensioning the parking brake cable of a vehicle, comprising:

a housing adapted to be connected to the vehicle;

a pivot assembly adapted to be connected at a first point of said pivot assembly the vehicle brake cable and rotatably positioned around a main pivot within said housing;

a main spring positioned along a main spring longitudinal axis, said main spring having a fixed end positioned adjacent said housing and a free end positioned adjacent a second point of said pivot assembly, said main spring biasing said pivot arm assembly toward a brake-applied position;

a spring compression assembly capable of compressing said main spring along said main spring longitudinal axis such that said pivot arm assembly is rotated toward a brake-released position;

a retaining assembly capable of retaining said pivot arm assembly in said brake-released position; and a releasing assembly for releasing said retaining assembly, thereby permitting said main spring to return said pivot arm assembly toward said brake-applied position.

2. The apparatus of claim 1 wherein said pivot arm assembly comprises a rotatable metal hub mounted concentrically about said main pivot, and a bellcrank rigidly attached to said hub to rotate with said hub.

3. The apparatus of claim 2 wherein said retaining assembly comprises a helical clutch spring mounted concentrically about said metal hub of said pivot arm assembly, said clutch spring being arranged to permit rotation of said pivot arm assembly in a brake-releasing direction, but to resist rotation of said pivot arm assembly in a brake-applying direction.

4. The apparatus of claim 3 wherein the clutch spring includes first and second radially outward extending leg portions at opposite ends thereof, said first radially outwardly extending leg portion being connected to said outer housing and said second radially outwardly extending leg portion being capable of being moved by said releasing assembly relative to said first leg portion in a direction to expand said clutch spring, thereby to release said metal hub and to enable said main spring to return said pivot arm assembly toward said brake-applied position.

5. The apparatus of claim 4 wherein said releasing assembly comprises a brake apply arm rotatably mounted concentrically about said main pivot, said brake apply arm having an outwardly extending arm portion that is detachably positioned adjacent said second leg portion of said clutch spring.

6. The apparatus of claim 5 wherein said releasing assembly comprises a helical brake spring mounted concentrically about said main pivot, said brake spring having at each end a radially outwardly extending leg portion, a first leg portion being detachably positioned adjacent said metal hub and a second said leg portion being detachably positioned adjacent outwardly extended arm portion of the brake apply arm, said brake spring biasing said brake apply arm away from said second leg portion of said clutch spring.

7. The apparatus of claim 2 wherein said pivot arm assembly comprises a main spring compression washer rotatably connected at said second point to said pivot arm assembly, said main spring compression washer being positioned immediately adjacent said free end of said main spring.

8. The apparatus of claim 1 wherein said spring compression assembly comprises a hydraulic piston.

9. The apparatus of claim 1 wherein said spring compression assembly comprises a pneumatic piston.

10. The apparatus of claim 1 wherein said spring compression assembly comprises a mechanical screw drive.

11. The apparatus of claim 1 wherein said retaining assembly is capable of retaining said pivot arm assembly in said brake-released position independently of said spring compression assembly.

12. The apparatus of claim 1 further comprising a safety pin detachably positioned through an opening in said pivot arm assembly whereby said pivot arm assembly is prevented from rotating about said main pivot.

13. A parking brake system for tensioning the parking brake cable of a vehicle, comprising:

a pivot arm assembly, comprising a bellcrank rigidly attached to a metal hub, said metal hub being free to rotate and mounted concentrically about a main pivot within an outer housing, said pivot arm assembly being connected at a first point to the vehicle brake cable and said pivot arm assembly being rotatably connected at a second point to a main spring compression washer;

a main spring positioned along a main spring longitudinal axis, said main spring having a fixed end positioned adjacent said outer housing and a free end positioned adjacent said main spring compression washer, said main spring biasing said pivot arm assembly toward a brake-applied position;

a spring compression assembly capable of compressing said main spring along said main spring longitudinal axis such that said pivot arm assembly is rotated toward a brake-released position;

a retaining assembly retaining said pivot arm assembly in said brake-released position, said retaining assembly comprising a helical clutch spring mounted concentrically about said metal hub of said pivot arm assembly, said clutch spring being arranged to enable rotation of said pivot arm assembly in a brake-releasing direction but to resist rotation of said pivot arm assembly in a brake-applying direction, said clutch spring having at each end a radially outwardly extending leg portion, a first leg portion being connected to said outer housing and a second leg portion being capable of being moved relative to said first leg portion in a direction to expand said clutch spring; and a releasing assembly comprising a brake apply arm rotatably mounted concentrically about said main pivot, said brake apply arm having an outwardly extending arm portion that is detachably positioned adjacent said second leg portion of said clutch spring, said brake apply arm being capable of moving said second leg portion of said clutch spring, thus expanding said clutch spring and releasing said metal hub, thereby permitting said main spring member toward return said pivot arm assembly to said brake-applied position.

14. A brake control apparatus for attachment to the parking brake cable of a vehicle braking system, comprising:

a housing;

a rotor assembly pivotally supported within said housing to pivot between a brake-released position and a brake-applied position, and adapted to be attached to a brake cable;

a main spring assembly mounted within said housing, said main spring being compressed when in a brake-released condition and adapted upon expansion to rotate said rotor to said brake-applied position;

a spring compression device operable and adapted to compress said main spring and thereby enable said rotor assembly to pivot to said brake-released position;

a clutch operable in a first position to engage and keep said rotor in its brake-released position and thereby retain said main spring compressed independently of said spring compression device;

said clutch operable in a second position to release said rotor and thereby enable said main spring to expand and pivot said rotor to its brake-applied position; and a clutch release member operable to engage and disengage said clutch.

15. The apparatus of claim 14 wherein said spring compression device comprises a pneumatically or hydraulically actuated piston and cylinder assembly.

16. The apparatus of claim 14 wherein said spring compression device comprises a lead screw.

17. The apparatus of claim 14 wherein said clutch comprises a helical spring centered around said rotor assembly, said helical spring in a contracted position operable to engage said rotor and resist its rotation, and in an expanded position to disengage from said rotor.

18. The apparatus of claim 14 further comprising a linkage connecting said main spring assembly and said rotor such that movement of said main spring between its expanded and contracted positions causes movement of said rotor between its brake-applied and brake-released positions, respectively.

* * * * *

UNITED STATES PATENT AND TRADEMARK OFFICE
CERTIFICATE OF CORRECTION

PATENT NO. : 5,601,162
DATED : February 11, 1997
INVENTOR(S) : Robert L. Heiman

It is certified that error appears in the above-identified patent and that said Letters Patent is hereby corrected as shown below:

In claim 1, at column 6, line 26, after the phrase "said pivot assembly" insert the word --to--.
In claim 13, at column 8, line 16, delete "to" and insert --toward--.
In claim 1, at column 6, line 33, delete "arm".
In claim 1, at column 6, line 37, delete "arm".
In claim 1, at column 6, line 39, delete "arm".
In claim 1, at column 6, line 43, delete "arm".
In claim 2, at column 6, line 44, delete "arm".
In claim 3, at column 6, line 50, delete "arm".
In claim 3, at column 6, line 51, delete "arm".
In claim 3, at column 6, line 53, delete "arm".
In claim 4, at column 6, line 57, delete "outer".
In claim 4, at column 6, line 62, delete "arm".
In claim 7, at column 7, line 13, delete "arm".
In claim 7, at column 7, line 15, delete "arm".
In claim 11, at column 7, line 26, delete "arm".

Signed and Sealed this

Twenty-second Day of July, 1997

Attest:

Attesting Officer

BRUCE LEHMAN

Commissioner of Patents and Trademarks